US007730264B1

United States Patent
Sistla

(10) Patent No.: US 7,730,264 B1
(45) Date of Patent: Jun. 1, 2010

(54) ADAPTIVELY REDUCING MEMORY LATENCY IN A SYSTEM

(75) Inventor: Krishnakanth Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 11/526,431

(22) Filed: Sep. 25, 2006

(51) Int. Cl.
*G06F 12/00* (2006.01)
(52) U.S. Cl. .............................. 711/138; 711/E12.021
(58) Field of Classification Search .................. 711/118
See application file for complete search history.

(56) References Cited

U.S. PATENT DOCUMENTS

| 6,009,488 A | 12/1999 | Kavipurapu ................. 710/105 |
| 6,263,404 B1 * | 7/2001 | Borkenhagen et al. ...... 711/137 |
| 7,320,022 B2 * | 1/2008 | Hayter et al. ................ 709/215 |
| 2003/0140202 A1 * | 7/2003 | LaBerge ....................... 711/154 |
| 2004/0148472 A1 * | 7/2004 | Barroso et al. .............. 711/141 |
| 2005/0050278 A1 * | 3/2005 | Meier et al. .................. 711/128 |

OTHER PUBLICATIONS

U.S. Appl. No. 11/392,335, filed Mar. 29, 2006, entitled "Speculatively Performing Read Transactions" by Ling Cen, Vishal Moondhra and Tessil Thomas.

* cited by examiner

*Primary Examiner*—Reginald G Bragdon
*Assistant Examiner*—Aracelis Ruiz
(74) *Attorney, Agent, or Firm*—Trop, Pruner & Hu, P.C.

(57) ABSTRACT

In one embodiment, the present invention includes a method for routing an early request for requested data on a bypass path around a transaction processing path of a first agent if the requested data is not present in a cache memory of the first agent, and opportunistically transmitting the early request from the first agent to a second agent based on load conditions of an interconnect between the first agent and the second agent. In this way, reduced memory latencies may be realized. Other embodiments are described and claimed.

23 Claims, 5 Drawing Sheets

ADAPTIVELY REDUCING MEMORY LATENCY IN A SYSTEM

BACKGROUND

Embodiments of the present invention relate to operation of a processor, and more particularly to obtaining data for use in a processor.

When data needed for an operation is not present in the processor, a latency, which is the time it takes to load the data into the processor, occurs. Such a latency may be low or high, depending on where the data is obtained from within various levels of a memory hierarchy. In some systems, prefetching schemes are used to generate and transmit prefetch requests corresponding to data or instructions that are predicted to be needed by a processor in the near future. When the prediction is correct and data is readily available to an execution unit, latencies are reduced and increased performance is achieved. However, prefetching can require significant computational resources, and can consume chip area and power consumption. Furthermore, prefetch requests, in addition to actual memory requests, still suffer from latencies.

That is, in addition to a memory latency incurred in requesting data from a remote location (e.g., memory, mass storage or the like), in many systems a processor socket may have its own latency associated with generating and sending transactions outside the processor socket. These delays, which may be applicable to all transactions, can be associated with delays of serialization/de-serialization, related protocol processing, and so forth. For example, in systems implementing a serial point-to-point (PTP) distributed interconnect system, latencies can occur in transaction processing through protocol and link layers in each of multiple agents through which a transaction passes. Such delays can incur a significant amount of cycles before a request is even sent out of the processor socket, and can negatively impact performance.

As more systems are architected with a distributed memory system and serial interconnects, latencies of such serial-based protocols can affect performance. Thus although improvements in memory latency generally translate into performance improvements across all applications, improvements in memory bandwidth typically only benefit certain classes of applications. As an example, depending on a given type of application, serial interconnects from a processor socket to other system components, such as chipsets, memory and so forth, may use limited bandwidth. However, such applications may still suffer from increased latencies due to serial-based interconnects.

DETAILED DESCRIPTION

Figure 1:
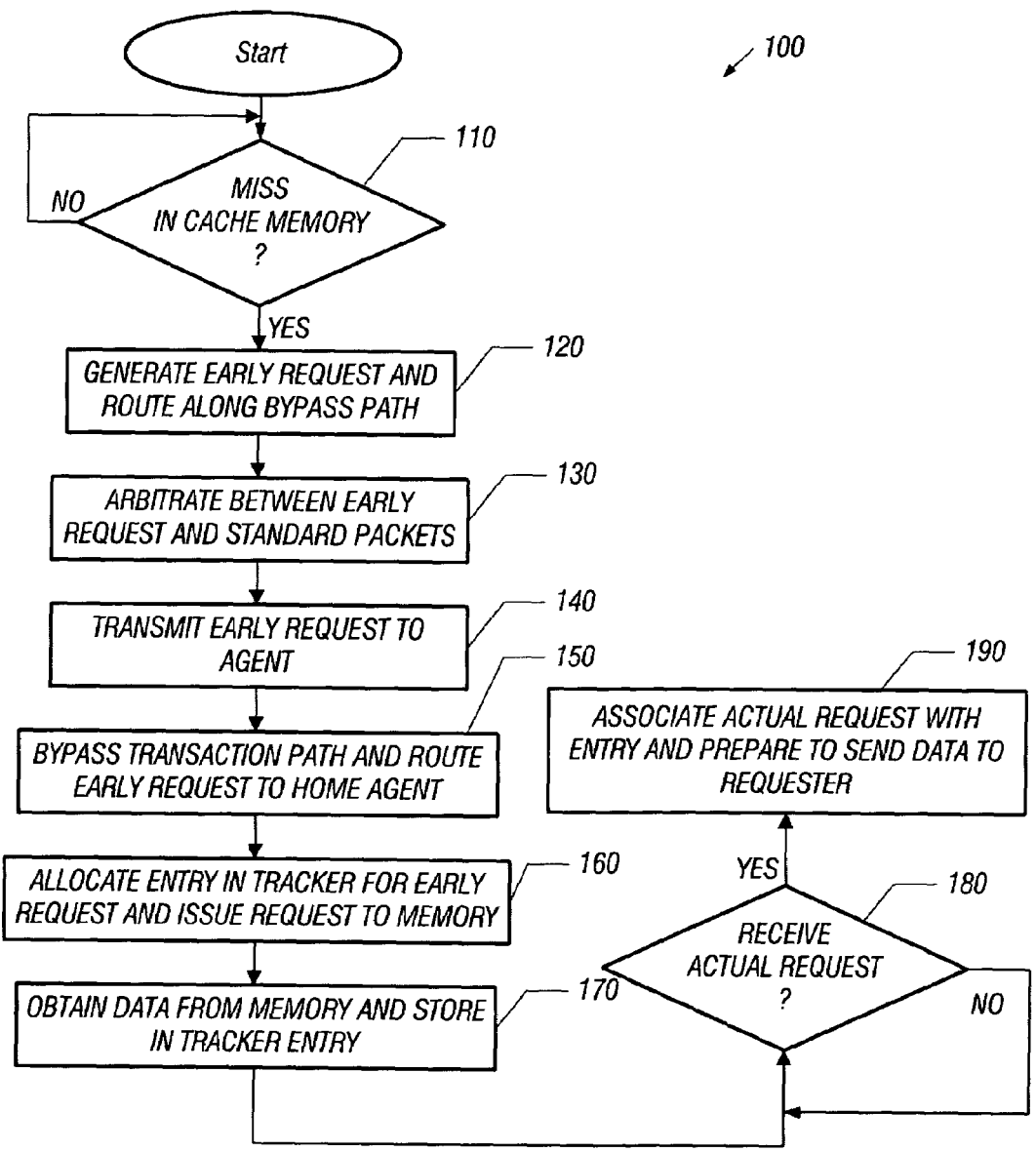
FIG. 1 is a flow diagram of a method in accordance with one embodiment of the present invention.

Requests generated in a processor socket may be formed according to a given communication protocol. In various implementations that incorporate a point-to-point (PTP) communication protocol, significant delays may occur in forming and transmitting a request packet from a first agent (e.g., a processor socket) to another agent. To reduce an overall latency from the time of sending a packet requesting data to receiving the data for the requested operation, embodiments may generate and send an early request for the data to a home agent at an earlier point in time than an actual request for the data.

In many embodiments, systems may be implemented using a PTP protocol. In a PTP system, agents are interconnected via serial links or interconnects which couple one agent to another. The agents may correspond to processor sockets, memory, hub agents such as chipset components, e.g., memory controller hubs (MCHs), input/output (I/O) controller hubs (ICHs), other processors and the like. The agents of such systems communicate data via an interconnection hierarchy that typically includes a protocol layer, an optional routing layer, a link layer, and a physical layer. This interconnection hierarchy may be implemented in an interface of each agent. That is, each agent may include one or more interfaces to enable communication.

The protocol layer, which is the highest layer of the interconnection hierarchy, institutes the protocol. The protocol layer is a set of rules that determines how agents communicate. For example, the protocol sets the format for a transaction packet, which may correspond to the unit of data that is communicated between nodes. Such a packet typically contains information to identify the packet and its purpose (e.g., whether it is communicating data in response to a request or requesting data from another node).

The routing layer determines a path over which data is communicated between nodes. Because in some systems, each node may not be connected to every other node, there can be multiple paths over which data may be communicated between two particular nodes. The link layer receives transaction packets from the protocol layer (or routing layer if it is present) and communicates them in a sequence of flits (which may be 80 bits in one embodiment). The link layer handles flow control, which may include error checking and encoding mechanisms. Through the link layer, each node keeps track of data sent and received and sends and receives acknowledgements in regard to such data.

Finally, the physical layer may include the actual electronics and signaling mechanisms at each node. In a point-to-point, link-based interconnection scheme, there are only two agents connected to each link. The physical layer and link layer include mechanisms to deal with high-speed serial links with relatively high bit error rates, high latency and high round trip latency.

In this hierarchy, the link layer may transmit data in flits which may then be decomposed into phits (e.g., ¼ of a flit length) at the physical layer and communicated over a PTP interconnect to the physical layer of a receiving agent. The received phits may then be integrated into flits at the physical layer of the receiving agent and forwarded to the link layer of the receiving agent, which combines the flits into transaction packets for forwarding to the protocol layer of the receiving agent. Of course, other protocols may handle communications differently, and the scope of the present invention is not limited in this regard.

Thus while embodiments of the present invention may be implemented in many different system types, some embodiments may be used in systems incorporating a PTP communication protocol, for example, a serial-based PTP communication protocol. Such systems may be subject to communication latencies as a result of the serial communication protocol such as described above. For example, in contrast to a shared bus structure, such as a front side bus (FSB)-type implementation, there are various overhead delays associated with protocol processing, serialization/de-serialization and so forth. However, it is to be understood that embodiments may be implemented in many different types of systems.

Referring now to FIG. 1, shown is a flow diagram of a method in accordance with one embodiment of the present invention. As shown in FIG. 1, method 100 may be used to reduce latencies in obtaining data that misses in a local memory, such as a cache memory, for example, a last level cache (LLC). As shown in FIG. 1, method 100 may begin by determining if a miss occurs in a cache memory (diamond 110). For example, in some implementations, method 100 may begin upon determining that a miss has occurred in an LLC of a processor socket. Because requested data is not present in the processor socket, a request is generated to obtain the data from another location, e.g., another system agent including the data. If no miss occurs, diamond 110 may loop back on itself.

As shown in FIG. 1, if it is determined that a miss occurs in the cache memory, control passes to block 120. At block 120, an early warning, referred to herein as an early request, may be generated. This request may be routed along a bypass path of the processor socket. While the scope of the present invention is not limited in this regard, in some embodiments the early request may be a generic packet, e.g., a generic debug packet that can be injected very late into a standard communication pipeline of the socket. This may be so, as the generic debug packet need not adhere to a given communication protocol's ordering rules, error checking activities, and so forth. Accordingly, this packet may be rapidly generated and provided on a bypass path that reduces the overhead associated with various layers of the communication protocol, such as a protocol layer and at least portions of a link layer. As will be described further below, in some embodiments the bypass path may include a buffer or other storage to buffer such early requests until they are able to pass through to other components of a processor socket, e.g., a physical layer for transmission to another agent.

Still referring to FIG. 1, arbitration may occur between an early request and standard packets (block 130). That is, standard requests that flow along a standard transaction path of the processor socket may generally take precedence over early requests. However, in the course of processing standard packets, one or more null locations, e.g., a null flit may be present. In place of this null flit, the early request may be inserted. Accordingly, in various embodiments the arbitration may provide for opportunistic handling to enable early requests to be transmitted when availability is present in the standard transaction path. By arbitrating between early requests and standard packets, embodiments of the present invention may thus adaptively alleviate the effects of longer latencies due to a distributed interconnect, based on the interconnect utilization. That is, embodiments may opportunistically insert early requests based on the interconnect bandwidth between the processor socket and another agent. Thus where applications consume higher bandwidth on the interconnect, early requests may be limited or not selected for transmission whatsoever. However, when applications have less utilization of the interconnect bandwidth, early requests may pass along the interconnect to enable reduced memory latencies. While the scope of the present invention is not limited in this regard, in many embodiments control of arbitration between early requests and actual requests may be automatically handled. That is, if availability exists (e.g., due to presence of one or more null locations), the early request may be selected and sent, otherwise it is not.

When selected for arbitration at block 130, the early request may be transmitted to an agent coupled to the processor socket (block 140). The agent may take many forms in different embodiments. For example, in some implementations the agent may be another processor socket, a chipset component such as a input/output hub (IOH), a memory controller hub (MCH), a memory, an I/O device or another such component.

To enable further reduced latencies, the agent receiving the early request may also have a bypass path to enable such early requests to bypass transaction processing (e.g., error checking, ordering and the like) that would typically occur along a transaction path of the agent. In this way, reduced latencies in passing the early request to a proper location can be realized. Accordingly, still with reference to FIG. 1 at block 150 the early request may bypass the transaction path and be routed to a home agent. That is, the early request may flow along a bypass path directly to a home agent that may be a front end controller associated with a memory that includes the requested data (or is coupled to a memory or other storage including the data). At the home agent, an entry in an allocator such as a tracker structure may be allocated for the early request. Furthermore, the early request may be issued to memory (both at block 160). Note that the tracker structure may allocate an entry based on a transaction identifier (e.g., a request transaction identifier (RTID)) associated with the early request. Furthermore, this entry may be indicated to be a speculative entry, as it is associated with an early request and not an actual memory request that may later be received. However, although identified as speculative, the early request is in fact a request for data not present in the requester and thus in this sense is not a speculative request such as may be asserted with a prefetch request for data based on a prediction. Based on the issued request, the data may be obtained from the memory and stored in the tracker entry (block 170).

Referring still to FIG. 1, at diamond 180 it may be determined if an actual request that corresponds to the early request, i.e., an actual memory request that was received and processed along a standard path of the agent, has been received. Note that in other implementations, the actual memory request may be received prior to storing of the actual data in the entry of the tracker structure. Accordingly, diamond 180 may occur prior to block 170, in some instances. If the actual memory request has not been received, diamond 180 loops back on itself. When the actual memory request is received, control passes to block 190. At block 190, the actual memory request may be associated with the entry in which the early request is stored. Accordingly, an indicator for the entry may be changed from a speculative indication to an actual indication. Furthermore, if the data is already present in the entry, preparation for sending the data back to the requester (i.e., processor socket) may begin. If the data is not present, when the data becomes available and is stored in the tracker entry, preparation for transmission back to the requester may begin. While described with this particular implementation in the embodiment of FIG. 1, it is to be understood that the scope of the present invention is not so limited in this regard.

Figure 2:
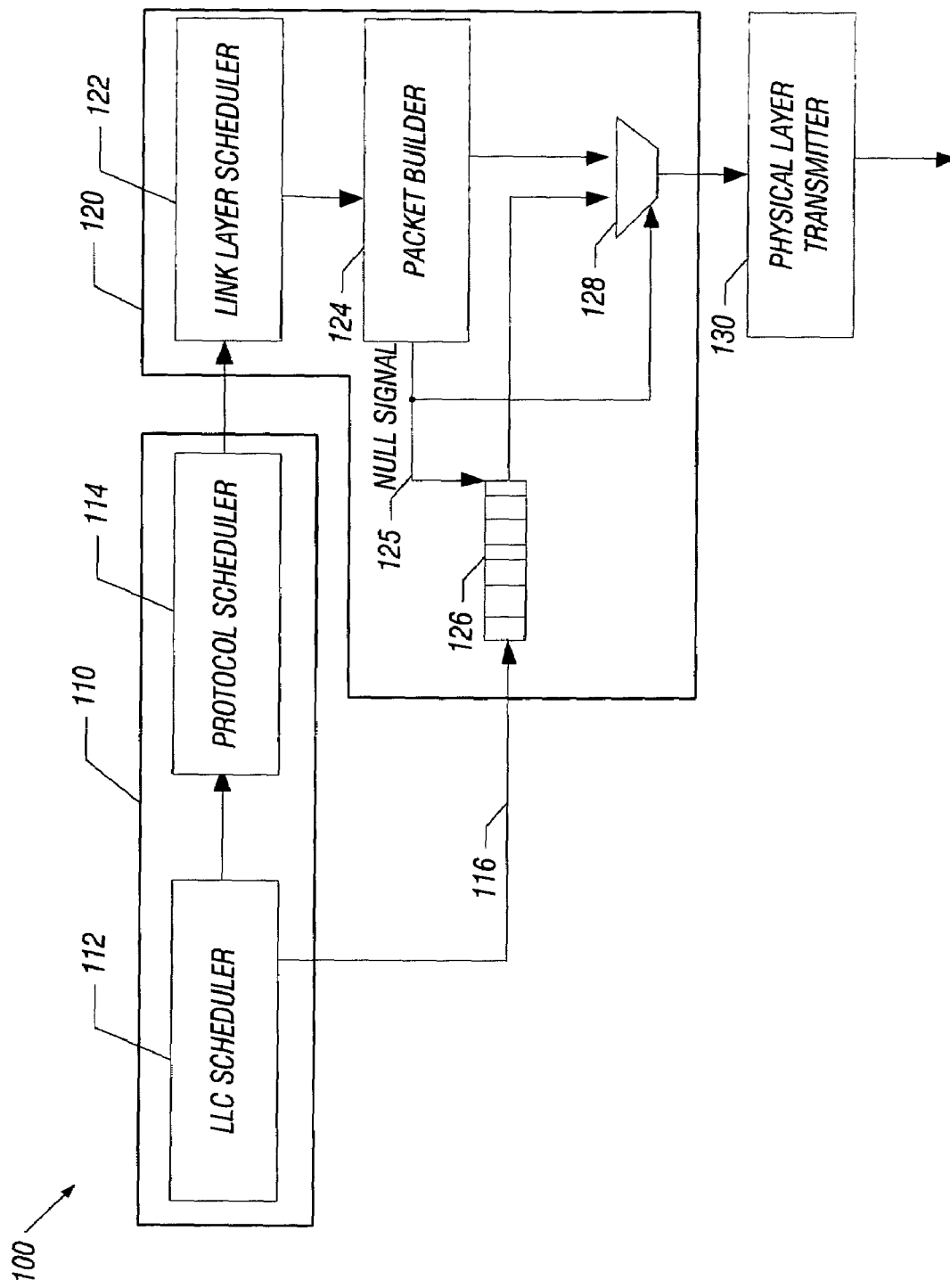
FIG. 2 is a block diagram of a portion of a first agent in accordance with one embodiment of the present invention.

Referring now to FIG. 2, shown is a block diagram of a portion of an agent (e.g., a first agent) in accordance with one embodiment of the present invention. As shown in FIG. 2, agent 100 may include various components for processing data and handling communication of requests, status, data, and so forth. As shown in FIG. 2, agent 100 includes a caching agent 110, a link layer 120 and a physical layer transmitter 130. Caching agent 110 may be used to generate and control snoop traffic, as well as to handle misses from a cache memory, such as an LLC (not shown in FIG. 2), among other functions. Thus as shown in FIG. 2, caching agent 110 includes an LLC scheduler 112 coupled to a protocol scheduler 114. In the embodiment of FIG. 2, LLC scheduler 112 may schedule requests for data for passing to an LLC and may further determine whether such requests hit or miss in the LLC. A miss occurs if data requested by, e.g., a core of the agent is not present in the LLC. In such event, LLC scheduler 112 may prepare a request to obtain the data from another source, e.g., another agent to which agent 100 is coupled. In one embodiment, to initiate such a request, a protocol RTID may be acquired. Furthermore, LLC scheduler 112 may also generate an early request for the missing data.

If the requested data is not in fact present in the LLC, a miss occurs and accordingly an RTID is acquired for the current request. This RTID may be used to both generate an actual request for the data, as well as an early request. The early request may be rapidly generated in LLC scheduler 112, as the early request may be a generic packet that need not comply with many protocol processing requirements, such as ordering requirements, full error checking capabilities and so forth. In one embodiment, the generic early request packet may include the RTID as well as the physical address corresponding to the address. This payload data may have minimal error detection mechanisms associated, such as a cyclic redundancy checksum (CRC), parity, or other mechanism. However, such error mechanisms need not be present, as in some embodiments, speed of generating and forwarding the early request may take precedence over absolute accuracy. That is, it may be more desirable to quickly transmit the early request to begin the process of obtaining requested data than to ensure that the early request packet is received accurately, as if it is incorrectly received by a receiving agent the packet may simply be dropped and the latency associated with the actual memory request may occur.

Note that in some implementations LLC scheduler 112 may, in parallel with requesting data from an LLC, generate an early request for the data to begin the process of requesting the data in case the data is not present in the LLC. Accordingly, as LLC scheduler 112 initiates a data request to the LLC, steps to generate an early request may also begin. Such steps may include generating an early request packet via generating a CRC computation using the address (e.g., physical address) of the data request as the miss address. Accordingly, by the time that the LLC result (i.e., miss or hit) is received by LLC scheduler 112, an early request packet may be already prepared. If a hit occurs and the data is present in the LLC, the early request packet may be squashed. However, many implementations may wait until the miss occurs before creating an early request packet.

In some embodiments, the early request may correspond to a debug packet, which may be a generic packet, e.g., of a single-flit length. As shown in FIG. 2, this early request packet may be sent directly out of caching agent 110 and to a link layer 120 along a bypass link 116. In parallel with sending this early request, LLC scheduler 112 may arbitrate the miss with other misses. Accordingly, an actual request for the missed data may be sent with the RTID to protocol scheduler 114, where it is scheduled for sending to link layer 120. In some embodiments, protocol scheduler 114 may include a buffer to buffer requests for passing to link layer 120.

As shown in FIG. 2, link layer 120 may include a link layer scheduler 122 to schedule incoming requests. In various embodiments, link layer scheduler 122 may arbitrate between different requests based on different message classes associated with the various requests. Furthermore, an arbitration between different virtual networks that may be used to pass messages corresponding to one or more of the message classes may occur. From link layer scheduler 122, messages are passed to a packet builder 124, which may generate a packet for the message according to the given protocol, e.g., a serial-based PTP protocol. Such packet building may incorporate headers onto the message, perform checksums, such as a CRC or another error detection mechanism, among other tasks. When prepared, packet builder 124 may output a packet to a multiplexer 128.

As shown in FIG. 2, multiplexer 128 is further coupled to receive an output from a buffer 126. Buffer 126 may be an early request buffer that is used to buffer incoming early requests generated by LLC scheduler 112 of caching agent 110. Buffer 126 may store the early requests sent on bypass link 116, and in one embodiment may be a first-in-first-out (FIFO) buffer. In various embodiments, these early requests may be transmitted only when an interconnect between agents is being lightly used. Accordingly, if buffer 126 is full, this is an indication that there are few or no opportunities to inject early requests into the interconnect. In various embodiments if buffer 126 is full, no further early requests are input thereto, and such early requests may be dropped.

Referring still to FIG. 2, multiplexer 128 may be used to arbitrate between early requests from buffer 126 and packets from packet builder 124. In some implementations, multiplexer 128 may be controlled by packet builder 124, such that an early request is selected out of multiplexer 128 only if a next output from packet builder 124, i.e., a next flit, is a null flit. Accordingly, early requests from buffer 126 may be transmitted opportunistically such that regular messages from packet builder 124 are not impacted by the early requests. In the embodiment of FIG. 2, a control signal (Null Signal 125 in the embodiment of FIG. 2) generated upon a null flit may control output from the head of buffer 126 and control selection of multiplexer 128.

Note that the output of multiplexer 128 is output from link layer 120 and provided to a physical layer transmitter 130, which may include various input/output (I/O) buffers, among other such structures to prepare the packet for transmission along the interconnect to another agent. In various embodiments, the interconnect may be a serial interconnect. While shown with this particular implementation in the embodiment of FIG. 2, it is to be understood the scope of the present invention is not limited in this regard.

Figure 3:
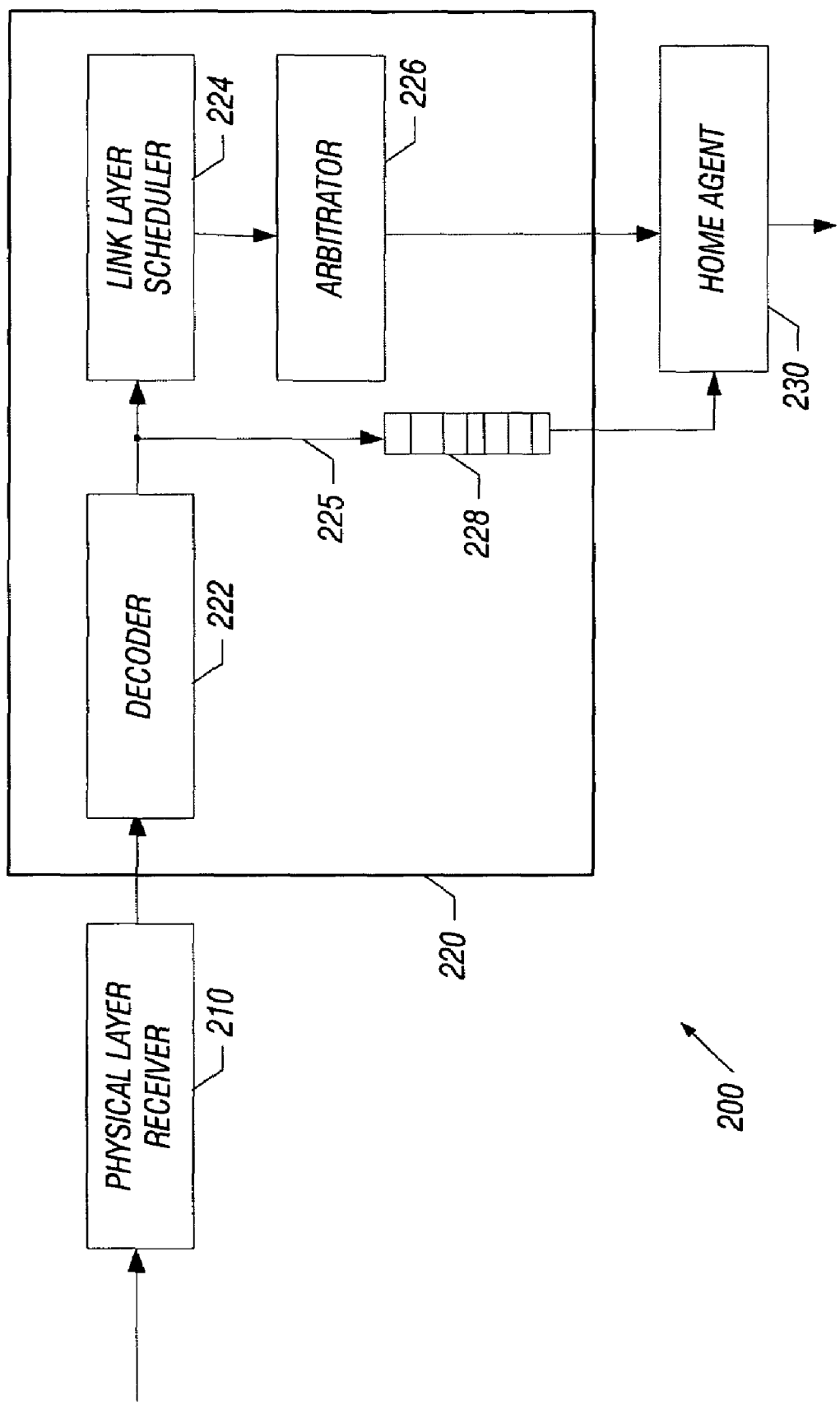
FIG. 3 is a block diagram of a portion of a second agent in accordance with one embodiment of the present invention.

When an early request is received in a receiving agent, a similar bypass path of the receiving agent may be used to directly forward the early request to a home agent of the receiving agent. The home agent may then process the early request to begin obtaining of the requested data. Referring now to FIG. 3, shown is a block diagram of a portion of another agent (e.g., a second agent) in accordance with one embodiment of the present invention. As shown in FIG. 3, agent 200 may be a receiving agent having a physical layer receiver 210 to receive incoming packets. Physical layer receiver 210 may process incoming serial data and provide packets to a link layer 220. As shown in the embodiment of FIG. 3, link layer 220 may include a decoder 222, a link layer scheduler 224, and an arbitrator 226. Link layer 220 also may include a buffer 228, which may be a FIFO in some embodiments.

In the embodiment of FIG. 3, decoder 222 may perform various decoding operations on incoming packets and furthermore may perform error detection mechanisms, such as performing a CRC check based on the CRC of the incoming packet. If decoder 222 determines the packet is an early packet and the CRC is invalid, the packet may be dropped. If the CRC check validates for an early request packet, the payload data including an address for the requested data and the RTID may be sent along a bypass path 225 to buffer 228. From buffer 228, early requests may be sent directly to a home agent 230, which may begin operations to obtain the requested data.

Otherwise, if decoder 222 determines that a standard packet has been sent, the decoded packet may be sent to a link layer scheduler 224 for placement into a buffer for scheduling. As further shown, an arbitrator 226 may be present. Arbitrator 226 may act to switch packets to/from various locations and to arbitrate between different message classes. The output of arbitrator 226 may be a selected command generated according to the given packet type. Accordingly, the command may be sent to home agent 230 for handling.

Note that some commands may be requests for data that correspond to the same data requested by an early request previously received by home agent 230. In such instances, a tracker within home agent 230 may already include an entry associated with the RTID of the early request. Thus when home agent 230 receives the actual request along the standard path, a status of the entry in its tracker may be updated to indicate that the request is an actual request rather than a speculative request, which may be the status associated with the early request.

While shown with this particular implementation in the embodiment of FIG. 3, it is to be understood the scope of the present invention is not limited in this regard and in other implementations, a receiving agent may have a different structure. Furthermore, note that while FIGS. 2 and 3 are described as transmitting and receiving agents, it is to be understood that various agents such as processors and chipsets (among many others) may include both receiving and transmitting portions such as those shown in FIGS. 2 and 3. Furthermore, the various agents may each include caching agents and home agents such as those set forth in FIGS. 2 and 3.

Furthermore, while described in connection with the particular operation set forth for the embodiments of FIGS. 2 and 3, it is to be understood that variations are possible. For example, in some instances early requests may become re-ordered with respect to a corresponding actual memory request. For example, if miss buffer 126 (of FIG. 2) is backed up because availability is not present, original requests could pass the early request. In this scenario, home agent 230 (of FIG. 3) may include logic to detect that the early request arrived after the actual request, and thus may drop the early request. Embodiments may further include logic such that when an actual memory request arrives, its address may be checked with a tracker entry for the early request so that conflicts may be resolved properly. For example, in implementations in a dual processor (DP) system, conflict resolution logic may be provided such that data returned responsive to an early request is provided to a winner of the conflict resolution.

Figure 4:
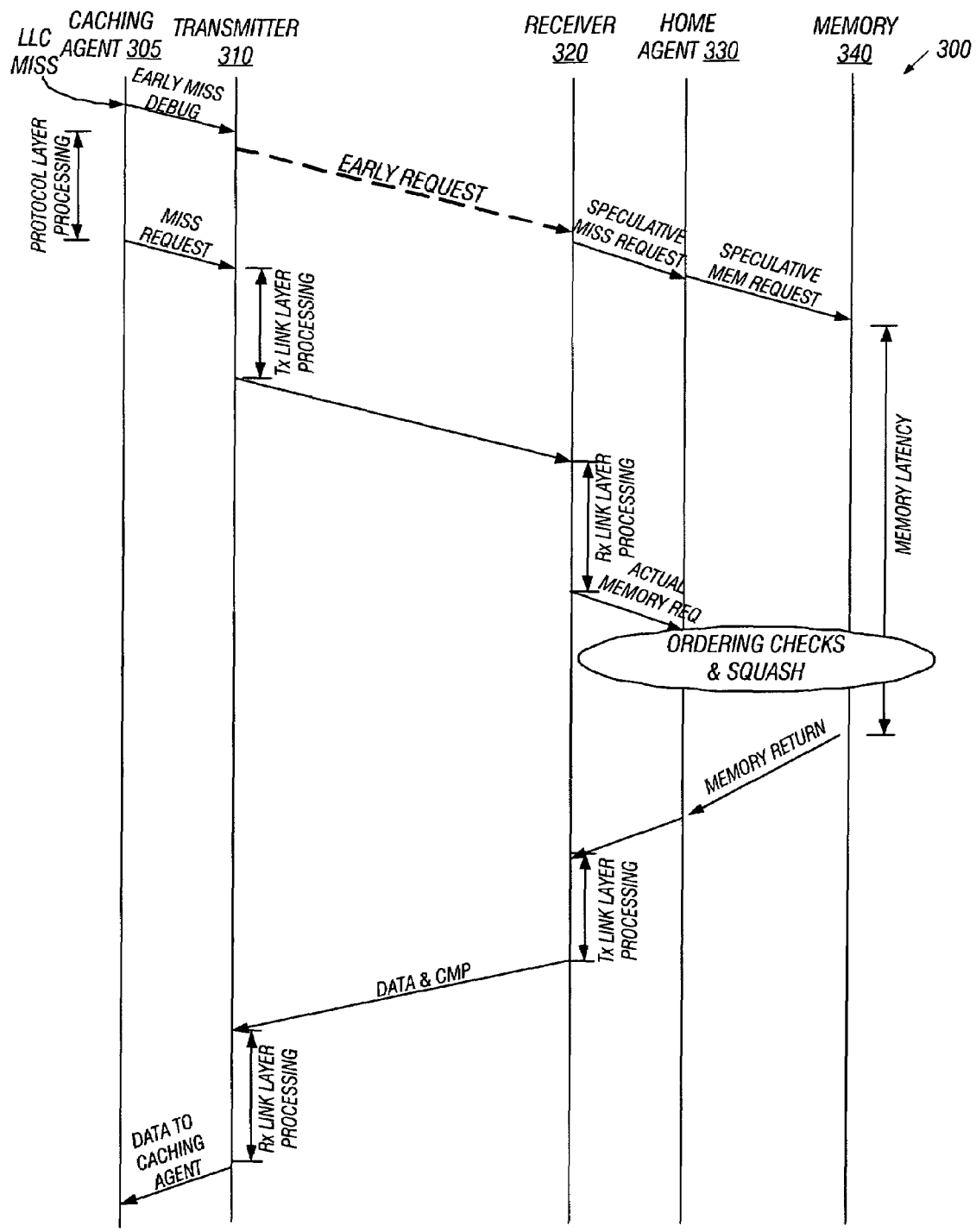
FIG. 4 is a timing diagram of system operation in accordance with one embodiment of the present invention.

Referring now to FIG. 4, shown is a timing diagram of processing of early requests and standard memory requests in a system such as a multiprocessor system in accordance with an embodiment of the present invention. As shown in FIG. 4, various events may occur in multiple portions of several processor sockets. Specifically, as shown in FIG. 4, a first processor socket may include a caching agent 305 and a transmitter 310, while a second processor socket may include a receiver 320 and a home agent 330. Furthermore, the second processor socket may be closely coupled with at least a portion of system memory that includes requested data, namely a memory 340.

As shown in the timing diagram of FIG. 4, on an LLC miss in the first processor socket, caching agent 305 may generate an early miss packet, which may correspond to a generic debug packet, in one embodiment. This generic debug packet is passed to transmitter 310, typically after it is injected after link layer processing. Transmitter 310 may thus transmit the early request, which is then received in the second processor socket by a receiver 320. Receiver 320 may identify this early request as an early (e.g., so-called speculative) miss request and forward the request packet directly to a home agent 330. That is, a bypass path of the second processor socket may be used to route this early request directly to home agent 330, which may then begin processing of the early request to obtain the requested data. Thus home agent 330 sends a speculative memory request to a memory 340 to obtain the data requested. To obtain the data and return it to home agent 330, a memory latency is incurred, as shown in FIG. 4.

Note that in parallel with the processing and handling of this early request, an actual miss request processed in parallel in the first processor socket may be generated in caching agent 305 and may traverse a standard transaction path of the first processor socket to arrive at transmitter 310 as a standard miss request. Note that the time difference between the early miss request from caching agent 305 and the transmission of the actual miss request by caching agent 305 may correspond to protocol layer processing of the actual request. Further note that additional latency is incurred in the transmission link layer processing performed in transmitter 310. Thus the time difference between transmission of the early request and transmission of an actual miss request for the data is the time incurred in performing protocol layer and link layer processing for the actual request.

Similarly, additional protocol processing in receiver 320 occurs upon receipt of the actual miss request, as this traverses a standard transaction path of the second processor socket. The actual memory request is transmitted to home agent 330, where ordering checks may be performed and any squashing occurs, if needed based on the protocol, including ordering resolution, conflict resolution and so forth. Because of the early request for data, the memory latency in memory 340 incurred to obtain the requested data is, as shown in FIG. 4, substantially completed prior to transmission of the actual memory request to home agent 330. Accordingly, when the data returns from memory to home agent 330, the data may be provided back to the first processor socket responsive to the actual memory request. Specifically, as shown in FIG. 4 the data may be sent from home agent 330 to receiver 320 via a standard link layer processing path such that the requested data and a completion packet is sent from the first processor socket to transmitter 310 of the first processor socket. Finally, link layer processing in the first processor socket may be performed to provide the requested data to the caching agent 305. Because of the early request for data, the overall latency in obtaining the requested data and providing it to the requesting caching agent 305 may be reduced, as shown in the example of FIG. 4.

Figure 5:
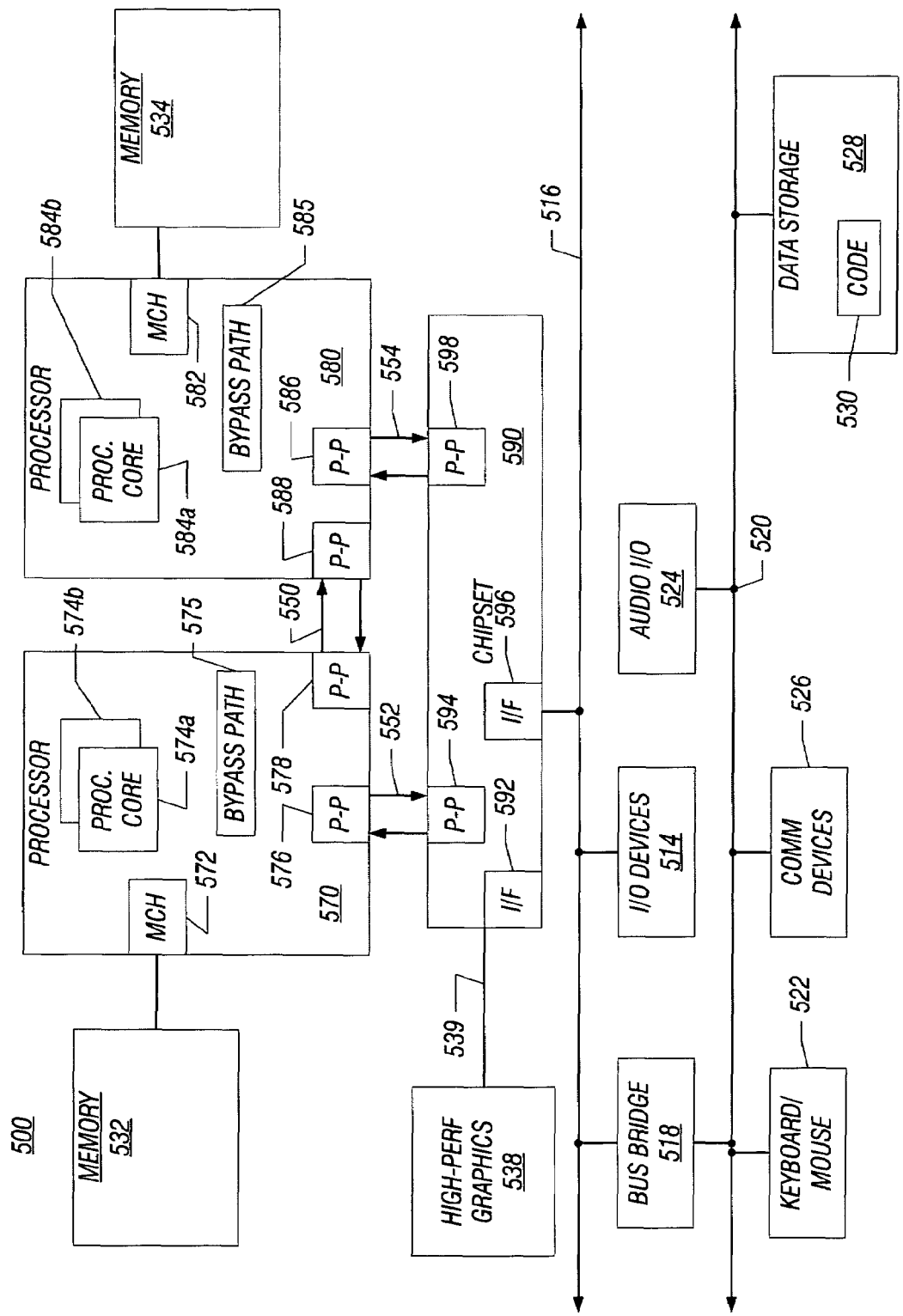
FIG. 5 is a block diagram of a multiprocessor system in accordance with one embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574*a* and 574*b* and processor cores 584*a* and 584*b*).

Each of processors 570 and 580 may further include bypass paths 575 and 585. Bypass paths 575 and 585 may be used to directly route early requests out of the processor and/or to a corresponding memory controller hub (MCH) 572 and 582 (which may act as a home agent, in some embodiments). Further still, in some embodiments a caching agent may provide early requests along bypass path 575 or 585 to bypass at least link layer processing of its own processor to thereby bypass into a home agent of the same processor. In this way, early requests corresponding to data misses may be sent out of processors 570 and 580 in parallel with the processing of the misses to generate actual read requests within processors 570 and 580 to be sent along standard transaction paths.

First processor 570 further includes point-to-point (P-P) interfaces 576 and 578. Similarly, second processor 580 includes P-P interfaces 586 and 588. As shown in FIG. 5, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 5, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
routing an early request for requested data on a bypass path around a transaction processing path of a first agent to bypass at least a portion of the transaction processing path if the requested data is not present in a cache memory of the first agent, the early request comprising a debug packet generated in a caching agent of the first agent and corresponding to a request for data not present in the cache memory; and
opportunistically transmitting the early request from the first agent to a second agent based on load conditions of an interconnect between the first agent and the second agent.

2. The method of claim 1, further comprising generating the early request in the caching agent of the first agent with a payload including an address for the requested data and a transaction identifier.

3. The method of claim 1, further comprising:
buffering the early request in a buffer of the bypass path; and
arbitrating between entries in the buffer and transactions of the transaction processing path for transmission, and selecting an entry of the buffer if a null location or empty slot is present in the transaction processing path.

4. The method of claim 1, further comprising generating an actual miss request for the requested data and routing the actual miss request through the transaction processing path, wherein the early request and the actual miss request include a common identifier.

5. The method of claim 1, further comprising routing the early request on a bypass path around a transaction pipeline of the second agent to a home agent associated with the requested data.

6. The method of claim 5, further comprising forming an entry in a tracker of the home agent based on the early request, and indicating the entry as speculative.

7. The method of claim 6, further comprising:
receiving a second request for the requested data in the second agent;
processing the second request in a transaction processing path of the second agent; and
associating the second request with the entry in the tracker for the early request, and indicating the entry as an actual request.

8. An apparatus comprising:
a transaction path to receive requests from an agent and to generate request packets for transmission from the apparatus;
a bypass path to bypass at least a portion of the transaction path, wherein the bypass path is to route an early request generated in the agent, the early request corresponding to a request for data not present in a cache memory and comprising a debug packet; and
an arbitrator coupled to the bypass path and the transaction path to arbitrate between the early request of the bypass path and the request packets of the transaction path.

9. The apparatus of claim 8, wherein the bypass path further comprises a buffer to temporarily store a plurality of early requests for data.

10. The apparatus of claim 8, wherein the arbitrator is to opportunistically transmit the early request for data based on availability in the transaction path.

11. The apparatus of claim 10, wherein the arbitrator is to opportunistically transmit the early request if a null location is present in the transaction path.

12. The apparatus of claim 8, wherein an actual request for the data not present in the cache memory is to be generated in the transaction path and to be routed through the transaction path.

13. The apparatus of claim 12, further comprising a second agent coupled to the apparatus to receive the request packets and the early request, wherein the agent is to forward the early request directly to a home agent associated with a storage including the data.

14. The apparatus of claim 13, wherein the agent is to receive the data from the second agent with a reduced latency responsive to the early request.

15. An article comprising a machine-readable storage medium including instructions that if executed by a machine enable the machine to perform a method comprising:
    generating a request packet for data not present in a cache memory of an agent and forwarding the request packet on a bypass path of the agent, wherein the request packet is forwarded in parallel with processing of a miss request for the data through a transaction pipeline of the agent, the bypass path to bypass at least a portion of the transaction pipeline and the request packet comprising a debug packet generated in the agent and corresponding to a request for data not present in the cache memory; and
    opportunistically transmitting the request packet from the agent to a second agent.

16. The article of claim 15, wherein forwarding the request packet comprises storing the request packet in an entry of a miss buffer.

17. The article of claim 16, wherein the method further comprises arbitrating an output of the transaction pipeline and an output of the miss buffer based on a load level of an interconnect between the agent and the second agent, wherein the transaction pipeline includes a packet builder.

18. The article of claim 17, wherein the method further comprises inserting the output of the miss buffer into a physical layer of the agent responsive to a control output of the packet builder generated if a null location is present in the transaction pipeline.

19. The article of claim 15, wherein generating the request packet comprises generating a generic packet including a transaction identifier and an address of the data not present in the cache memory, and wherein processing the miss request comprises generating a second request packet for the data not present in the cache memory including the transaction identifier and the address.

20. A system comprising:
    a first processor socket including at least one core, a cache memory, a caching agent, a transaction path coupled to the at least one core to receive requests from the at least one core and to generate request packets, and a bypass path to bypass at least a portion of the transaction path, wherein the bypass path is to route an early request in the form of a debug packet generated in the caching agent, the early request corresponding to a request for data not present in the cache memory;
    an agent coupled to the first processor socket, the agent including a transaction path to process incoming transactions and a bypass path to route the early request to a home agent of the agent; and
    a dynamic random access memory (DRAM) coupled to the agent.

21. The system of claim 20, wherein the first processor socket further comprises an arbitrator coupled to the bypass path and the transaction path to arbitrate between the debug packet and the request packets of the transaction path.

22. The system of claim 21, wherein the home agent includes a tracker to allocate an entry to store the debug packet and pass the early request to the DRAM.

23. The system of claim 22, wherein the tracker is to associate an actual request for the data not present in the cache memory with the entry and to update a status associated with the entry.

* * * * *